(12) United States Patent  (10) Patent No.: US 8,504,505 B2
Mintah  (45) Date of Patent: Aug. 6, 2013

(54) SYSTEM AND METHOD FOR CONTROLLING AN AUTONOMOUS WORKSITE

(75) Inventor: Brian Mintah, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 741 days.

(21) Appl. No.: 12/289,666

(22) Filed: Oct. 31, 2008

(65) Prior Publication Data

US 2010/0114808 A1 May 6, 2010

(51) Int. Cl.
*G06F 17/00* (2006.01)
*G06N 5/02* (2006.01)

(52) U.S. Cl.
USPC .................................. 706/46; 700/245; 701/1

(58) Field of Classification Search
None
See application file for complete search history.

(56) References Cited

U.S. PATENT DOCUMENTS

| | | | |
|---|---|---|---|
| 4,475,771 A | 10/1984 | Atwood et al. | |
| 4,952,000 A | 8/1990 | Lipinski et al. | |
| 6,553,299 B1 | 4/2003 | Keller et al. | |
| 6,877,153 B2 | 4/2005 | Konnersman | |
| 7,376,472 B2 | 5/2008 | Wojsznis et al. | |
| 2004/0158355 A1* | 8/2004 | Holmqvist et al. | 700/245 |
| 2006/0224534 A1 | 10/2006 | Hartman et al. | |
| 2006/0282423 A1 | 12/2006 | Al-Omari et al. | |
| 2006/0294220 A1 | 12/2006 | Asahara | |
| 2007/0100475 A1 | 5/2007 | Korchinski | |
| 2007/0142975 A1 | 6/2007 | Piche | |
| 2007/0143251 A1 | 6/2007 | Brooks et al. | |
| 2007/0150424 A1 | 6/2007 | Igelnik | |
| 2007/0174335 A1 | 7/2007 | Konig et al. | |
| 2007/0233285 A1 | 10/2007 | Yamamoto | |
| 2007/0271002 A1 | 11/2007 | Hoskinson et al. | |
| 2007/0276851 A1 | 11/2007 | Friedlander et al. | |
| 2008/0046272 A1 | 2/2008 | Menabde et al. | |
| 2008/0269977 A1* | 10/2008 | Palladino | 701/30 |
| 2009/0177335 A1* | 7/2009 | Young et al. | 701/1 |
| 2009/0327011 A1* | 12/2009 | Petroff | 705/8 |

\* cited by examiner

*Primary Examiner* — Omar F Fernandez Rivas
*Assistant Examiner* — Luis Sitiriche
(74) *Attorney, Agent, or Firm* — Finnegan, Henderson, Farabow, Garrett & Dunner LLP

(57) ABSTRACT

A control system is disclosed for providing a control decision to an autonomous worksite. The control system may include a communication interface configured to collect information related to an index of the autonomous worksite. The control system may also include a storage device configured to store the collected information and a plurality of constraint models. Each constraint model may characterize the mathematical relationship between the index and at least one control variable. The control system may further include a processor coupled to the communication interface and the storage device. The processor may be configured to build an optimization model for optimizing the index, based on the plurality of constraint models and the collected information. The processor may be further configured to determine the at least one control variable associated with the autonomous worksite by solving the optimization model. The processor may also be configured to make a control decision based on the determined control variable, and provide the control decision to the autonomous worksite.

18 Claims, 5 Drawing Sheets

OPTIMIZATION MODEL 300

MAX/MIN $\begin{bmatrix} \text{PRODUCTIVITY MODEL } f_3(x) \\ \text{PROFITABILITY MODEL } f_2(y) \\ \text{EFFICIENCY MODEL } f_3(z) \end{bmatrix}$ $\begin{matrix} 310 \\ 320 \\ 330 \end{matrix}$ SUBJECT TO $\begin{bmatrix} g_1(x) < T_1 \\ g_2(y) > T_2 \\ T_3 < g_3(z) < T_4 \end{bmatrix}$

PRODUCTIVITY - SITE VELOCITY MODEL 311

PRODUCTIVITY-REPAIR FREQUENCY MODEL 312

PROFITBILITY - COMMODITY MODEL 321

PROCESS 400 CONT

SYSTEM AND METHOD FOR CONTROLLING AN AUTONOMOUS WORKSITE

TECHNICAL FIELD

The present disclosure relates generally to a system and method for controlling an autonomous worksite, and relates more particularly to a system and method for controlling an mining worksite by optimizing indices related to the worksite.

BACKGROUND

Autonomous worksites are designed to provide productivity gains through more consistency in processes. For example, an autonomous mining worksite may have a plurality of robust autonomous sub-systems that are integrated with mining trucks. The operation of the worksite, such as the operation of the mining trucks, is usually controlled by computers and other electronic controllers rather than human operators. As a result, autonomous mining may minimize the environmental impact on the mining worksite, enhance the productivity of the mining trucks, and reduce the human resources for controlling the operation of the worksite.

On an autonomous worksite, such as a mining worksite, controls of operations are usually performed with the goal to optimize certain indices related to the autonomous system based on available recourses. Examples of indices to be maximized may include productivity, efficiency, profitability, etc. Meanwhile, it is also beneficial that certain other indices, such as high fuel usage, asset under-use, and high dealer repair frequency, are minimized. Each of these indices may be influenced by various factors and the maximum/minimum of each of the indices may be achieved when the set of factors satisfies a certain condition.

As an example, a mining worksite may include a plurality of hauler dump trucks used to haul materials (e.g., iron ore) from the mining worksite, and a plurality of utility trucks used to clean and maintain the haul road. The operation of these trucks may potentially produce value, for example, from sale of the iron ore hauled by the system. Meanwhile, some associated costs may also occur, such as operating and maintanence costs, storage costs, etc. Therefore, the productivity of the mining worksite may be influenced by several factors including, but not limited to, economic market information such as commodity prices (e.g., price of the iron ore), as well as local worksite information such as the overall site velocity of the trucks, number of trucks dispatched, operating and maintenance costs, inventory size, etc.

Some of these factors may change dynamically and rapidly. For example, the commodity price at which the iron ore can be sold may be driven by supply and demand. Therefore, it is helpful if accurate and real time control decisions can be made to plan the available resources on the autonomous worksite. Accordingly, there is a need for a control optimizer that collects information influencing certain indices of the autonomous system and provide real-time strategic control to the autonomous worksite in response to the collected information so that the selected indices are optimized.

A computer-based method and system developed to support and coordinate professional and managerial work processes are disclosed in U.S. Pat. No. 6,877,153 to Konnersman ("the '153 patent"). In particular, the '153 patent discloses a method to model professional and managerial work processes as networks of multiple decisions. The model may include multiple participants who are in specific and differentiated roles. The system disclosed by the '153 patent may include generating project modules to direct and guide the behavior of the participants in the work process.

Although the method and system of the '153 patent may be useful in controlling an autonomous worksite and coordinating the equipment available on the worksite, it may nevertheless still be suboptimal. That is, although the method of the '153 patent models the work processes, it does not provide a function to optimize any indices associated with the professional and managerial work processes. As a result, the decisions made to direct and guide the participants' behavior do not result in an optimized value of a certain index that is most important to the work processes. Furthermore, the system described in the '153 patent does not allow the user to override its control decisions. In addition, the project modules and decisions, once generated by the system disclosed by the '153 patent may not be updated in real time in response to changes in the work processes. For example, participants may be added to or removed from the work processes, and the schedule and availability of the participants to perform a certain role may change dynamically and constantly.

The system and method of the present disclosure are directed towards overcoming one or more of the constraints set forth above.

SUMMARY

In one aspect, the present disclosure is directed to an control system for providing a control decision to an autonomous worksite. The control system may include a communication interface configured to collect information related to an index of the autonomous worksite. The control system may also include a storage device configured to store the collected information and a plurality of constraint models. Each constraint model may characterize the mathematical relationship between the index and at least one control variable. The control system may further include a processor coupled to the communication interface and the storage device. The processor may be configured to build an optimization model for optimizing the index, based on the plurality of constraint models and the collected information. The processor may be further configured to determine the at least one control variable associated with the autonomous worksite by solving the optimization model. The processor may also be configured to make a control decision based on the determined control variable, and provide the control decision to the autonomous worksite.

In another aspect, the present disclosure is directed to a method for providing a control decision to an autonomous worksite. The method may include collecting information related to an index of the autonomous worksite, and building an optimization model for optimizing the index based on a plurality of constraint models and the collected information. Each constraint model may characterize a mathematical relationship between the index and at least one control variable. The method may further include determining the at least one control variable by solving the optimization model, and making a control decision based on the determined control variable. The method may also include providing the control decision to the autonomous worksite.

DETAILED DESCRIPTION

Figure 1:
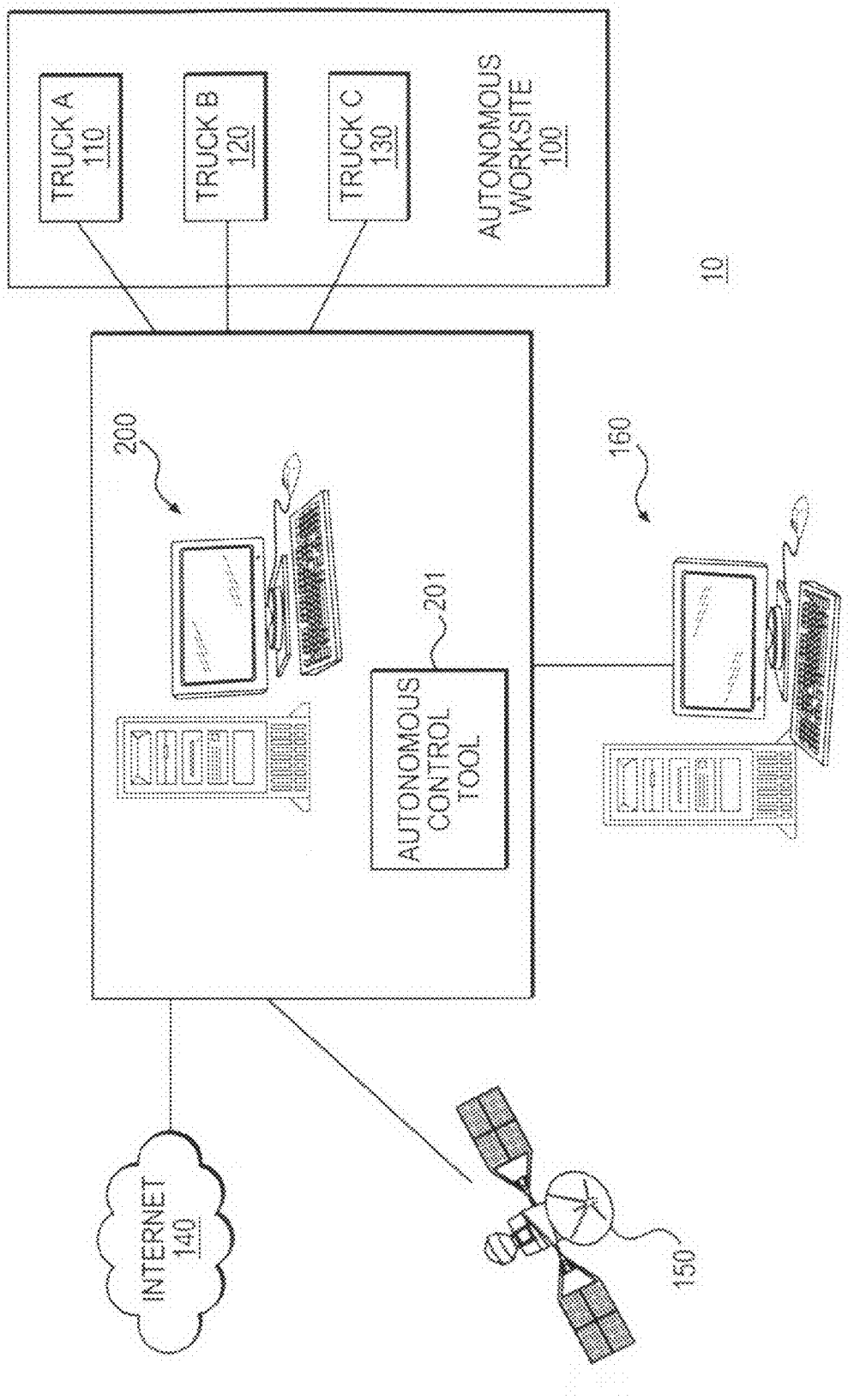
FIG. 1 is a schematic diagram of a control network for controlling an autonomous worksite, according to an exemplary embodiment of the present disclosure.

FIG. 1 is a schematic diagram of a control network 10 for controlling an autonomous worksite 100, according to an exemplary embodiment of the present disclosure. Autonomous worksite 100 may usually have thereon various autonomous equipment that is configured to perform a certain defined task. The operation of the autonomous equipment may be controlled by computer or computer-like electronic controllers, instead of human operators residing in an individual piece of equipment. For example, consistent with one embodiment of the present disclosure, autonomous worksite 100 may be an autonomous mining worksite. It is contemplated that autonomous worksite 100 may be any other type of worksite known in the art, for example, a landfill worksite, a quarry worksite, a construction worksite. Consistent with the present disclosure, autonomous worksite 100 may also be a semi-autonomous worksite where certain pieces of equipment or facilities on the worksite are operated directly or indirectly by human operators.

Autonomous mining worksite 100 may include thereon a plurality of autonomous trucks 110-130. In one embodiment, truck A 110 may be a hauler dump truck that is used to haul materials (e.g., iron ore) from the worksite, and truck B 120 may be a utility truck that is used to clean and maintain the haul road. It is contemplated that autonomous mining worksite 100 may further include other types of trucks, such as truck C 130 to perform various other tasks associated with mining. In some embodiments, autonomous mining worksite 100 may also have a plurality of robust autonomous subsystems that are integrated with trucks 110-130.

Consistent with one embodiment, trucks 110-130 may each include a communication device (not shown) configured to exchange data with one or more other trucks at autonomous mining worksite 100 and an autonomous control system 200. The communication device may embody any mechanism that facilitates the exchange of data among trucks 110-130, and between trucks 110-130 and autonomous control system 200. For example, the communication device may include hardware and/or software that enables the truck to send and/or receive data messages through a direct data link or a wireless communication link. The wireless communications may include, for example, satellite, cellular, infrared, the Ethernet, and any other type of wireless communications.

Consistent with one embodiment, trucks 110-130 may each further include a local controller (not shown) operatively connected to the communication device configured to control the operation of the truck. For example, the controller may be configured to autonomously control the actuation components of a truck. The controller may communicate with one or more hydraulic pumps, motor/steering mechanisms, power sources, transmission devices, and traction devices of the truck, to initiate, modify, or halt operations of the truck. The controller may include any means for monitoring, recording, storing, indexing, processing, and/or communicating the operational aspects of trucks 110-130. These means may include components such as, for example, a memory, one or more data storage devices, a central processing unit, or any other components that may be used to run an application. In this manner, the controller may provide for partial or full automatic control of the trucks 110-130.

The controller of each truck may receive control decisions from control network 10 via the communication device. Control network 10 may include, among other things, an autonomous control system 200 located in a centralized control station, and one or more distributed control systems 160. In some embodiments, autonomous control system 200 and the one or more distributed control systems 160 may send or receive data among each other via a wireless communication. Autonomous control system 200 may be further in communication with one or more servers on an Internet 140, and a satellite 150 via a satellite communication network. For example, autonomous control system 200 receive data related to autonomous mining worksite 100 from Internet 140 or satellite 150.

Consistent with one embodiment, autonomous control system 200 may be a computer or computer-like electronic controller that includes one or more computer assemblies configured to run a computer tool program. Autonomous control system 200 may be operated by a certified worksite operator and, as such, access to its contents may be limited to certain authorized personnel. Furthermore, different personnel may have different levels of access depending on the type of information or content they are authorized to view. Access may be regulated using any suitable password application known in the art. Data transferred to and from autonomous control system 200 may be protected using encryption software and other protection schemes, as would be apparent to one skilled in the art.

Autonomous control system 200 may include one or more software applications including, for example, an autonomous control tool 201. Autonomous control tool 201 may run on autonomous control system 200, and may be accessed by authorized personnel via their respective control interfaces. It is also contemplated that autonomous control tool 201 may be stored on a computer readable medium, such as a hard drive, computer disk, CD-ROM, or any other suitable medium, and may run on the one or more distributed control systems 160.

Autonomous control system 200 may be configured to collect information related to autonomous mining worksite 100 from Internet 140 and/or satellite 150. In some embodiments the collected information may be associated with an index of autonomous mining worksite 100, such as productivity, efficiency, or profitability of the worksite. As an example, the collected information may include economic market information such as commodity prices of the mine materials produced (e.g., iron ore) by autonomous mining worksite 100. Since the economic market may change dynamically, autonomous control system 200 may communicate with Internet 140 and/or satellite 150 and obtain updated information in real-time. As another example, the collected information may further include autonomous worksite information from trucks 110-130 and/or distributed control systems 160. Consistent with one embodiment, the autonomous worksite information may include, but not be limited to, an overall site velocity of the trucks, number of trucks dispatched, operating and maintenance costs of the trucks, and inventory size of the materials hauled from autonomous mining worksite 100. Consistent with one embodiment, the collected information may be stored in a storage device in autonomous control system 200.

Autonomous control system 200 may use autonomous control tool 201 to process the collected information and optimize one or more indices based on a plurality of constraint models. Consistent with one embodiment of the current disclosure, each constraint model may characterize the mathematical relationship between an index and at least one control variable. For example, autonomous control tool 201 may use a productivity-site velocity model that defines the mathematical relationship between the productivity of autonomous mining worksite 100 and the overall site velocity of trucks 110-130. Consistent with one embodiment, the constraint models may be pre-programmed in autonomous control tool 201 and stored on a storage device of autonomous control system 200. Consistent with another embodiment, the constraint models may be input and/or modified by an operator of autonomous control system 200.

Autonomous control tool 201 may be configured to build an optimization model for optimizing the selected indices, based on the plurality of constraint models and the collected information. For example, at a certain commodity price, operation and maintenance costs, and inventory level, an optimized productivity (i.e., maximum value of productivity) of the mining worksite may be achieved with a certain truck dispatch rate and certain overall site velocity. For the purpose of the present disclosure, an optimization model may be a mathematical model that attempts to optimize (maximize or minimize) an objective function constructed using the constraint models, subject to one or more conditions of the control variables.

Autonomous control tool 201 may be further configured to determine at least one control variable associated with autonomous mining worksite 100 by solving the optimization model. For example, a control variable may be the number of trucks that are to be dispatched in order to maximize productivity. The optimization problem may be solved as a single variable optimization or a multiple variable optimization.

Autonomous control tool 201 may also be configured to make a control decision based on the determined control variable. For example, once a control variable about the number of trucks that are to be dispatched is determined, autonomous control tool 201 may compare this number with the number of trucks currently dispatched (as in the collected information), and determine if more or less trucks should be dispatched. Autonomous control tool 201 may further determine which trucks to dispatch or recall. Accordingly, autonomous control system 200 may provide the control decision to trucks 110-130 at autonomous mining worksite 100, via wireless communication.

Consistent with some embodiments, the control decisions may not change instantaneously with the dynamic economic market. Autonomous control tool 201 may be configured to analyze the economic market trends, owning and operating cost trends, and inventory fluctuation, based on the information collected in real-time. Accordingly, instead of dramatic changes, the control decisions may include, for example, gradual increases or decreases of overall site velocity, number of dispatched trucks, and dealer repair frequencies, etc.

The one or more distributed control systems 160 may receive data from and send data to autonomous control system 200 via data-links, computer networks, wireless networks, or any other means of communication known in the art. Distributed control systems 160 may also be in communication with trucks 110-130 to collect information related to autonomous mining worksite 100. In some embodiment, each distributed control system 160 may be configured to collect information from a defined region of autonomous mining worksite 100, and then submit the aggregated information to autonomous control system 200. Similarly, autonomous control system 200 may send the control decision related to trucks in a particular region to a distributed control system 160 in that region, and distributed control system 160 may send the control decisions to the trucks.

Figure 2:
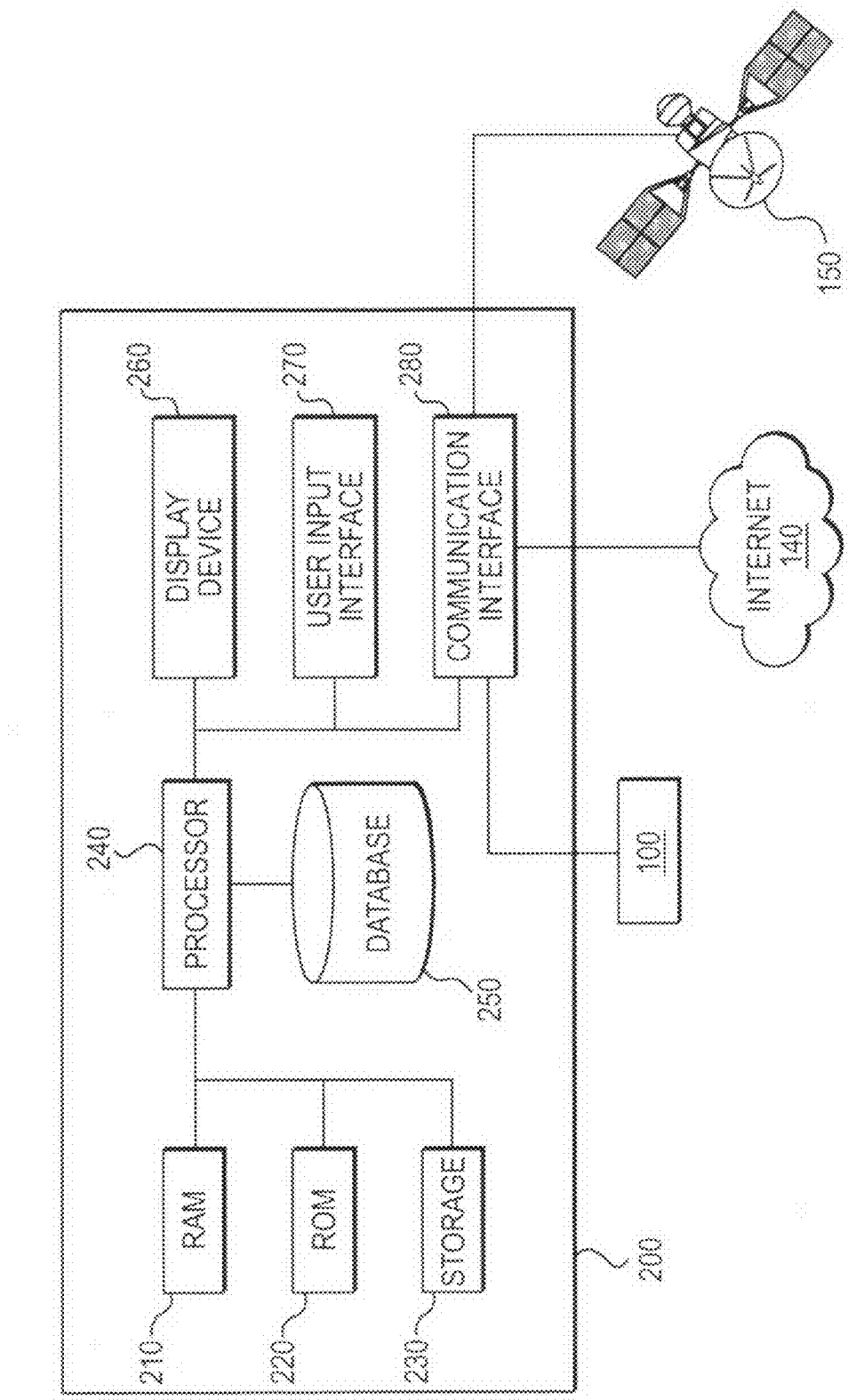
FIG. 2 is a schematic diagram of an control system, according to an exemplary disclosed embodiment of the present disclosure.

FIG. 2 is a schematic diagram of autonomous control system 200, according to an exemplary disclosed embodiment of the present disclosure. Autonomous control system 200 may include any means for collecting, analyzing, monitoring, storing, reporting, analyzing, optimizing, and/or communicating data. It is contemplated that the one or more distributed control systems 160 may also have structures and configurations similar to autonomous control system 200 disclosed in FIG. 2.

As shown in FIG. 2, autonomous control system 200 may include a random access memory ("RAM") 210, a read only memory ("ROM") 220, a storage device 230, a processor 240, a database 250, a display device 260, a user input interface 270, and a communication interface 280. It is contemplated that autonomous control system 200 may include additional, fewer, and/or different components than those listed above. It is understood that the type and number of listed devices are exemplary only and not intended to be limiting.

Processor 240 may be a central processing unit ("CPU"). Processor 240 may execute sequences of computer program instructions to perform various processes that will be explained later. The computer program instructions may be accessed and read from ROM 220, or any other suitable memory location, and loaded into RAM 210 for execution by processor 240. Depending on the type of computer being used in autonomous control system 200, processor 240 may include one or more printed circuit boards, and/or a microprocessor chip.

Storage device 230 may include any type of mass storage suitable for storing information. For example, storage device 230 may include one or more hard disk devices, optical disk devices, or any other storage devices that provide data storage space. In one embodiment of the present disclosure, storage device 230 may store data used by autonomous control tool 201 for optimizing the indices and determining control decisions. For example, storage device 230 may store information collected from Internet 140, satellite 150, and/or autonomous mining worksite 100. As another example, storage device 230 may also store the various constraint models used by autonomous control tool 201. In one embodiment, database 250 may also store data related to the optimization model and constraint models. Database 250 may further include analysis and organization tools for analyzing and organizing the information contained therein.

Display device 260 maybe, for example, a computer screen, an operator panel, or an LCD. Display device 260 may provide a graphical user interface ("GUI") to provide information to the operator who use autonomous control system 200. According to one embodiment, display device 260 may be configured to display interfaces of autonomous control tool 201. Display device 260 may further include an audio unit and provide an audible indication when an error or malfunction occurs at autonomous control system 200.

Autonomous control system 200 may be accessed and operated by an authorized autonomous worksite operator, using user input interface 270. User input interface 270 may be provided for the operator to input information into autonomous control system 200, and may include, for example, a keyboard, a mouse, and/or optical or wireless computer input devices (not shown). In one embodiment, the operator may identify one or more indices to be optimized via user input interface 270. In some other embodiments, the operator may also input and/or modify the constraint models via user input interface 270.

Communication interface 280 may provide communication connections such that autonomous control system 200 may exchange information with autonomous mining worksite 100 and certain external devices. Consistent with one embodiment, communication interface 280 may be configured to collect information, including economic market information and local worksite information. For example, communication interface 280 may include a network interface (not shown) configured to receive economic market information via Internet 140, and/or a satellite communication interface (not shown) configured to receive the information from satellite 150. Communication interface 280 may further include a wireless communication interface (not shown) to receive local worksite information via autonomous worksite information systems, such as the communication devices of trucks 110-130, and one or more distributed control systems 160.

Communication interface 280 may collect updated information from Internet 140, satellite 150, and/or the local worksite in real-time, for example, in every 10 seconds. The collected information may be sent to storage device 230 or database 250 for storage. Once updated information is received, display device 260 may be configured to display a request to the operator inquiring if he/she wants to optimize any index based on the updated information. The operator may provide input via user input interface 270. For example, the input may include clicking on the "yes" or "no" button in response to the request. If the "yes" button is clicked, the input may further include identifying one or more indices that he/she wants to optimize.

After receiving the user input, processor 240 may execute autonomous control tool 201 to optimize the one or more indices identified by the operator. For example, processor 240 may be configured to obtain a plurality of the constraint models stored in storage device 230 or database 250. Processor 240 may be configured to build an optimization model for optimizing the selected indices, based on the collected information and constraint models. Consistent with one embodiment, the optimization model may maximize/minimize an object function subject to certain conditions of the control variables.

Processor 240 may be further configured to solve the optimization problem for one or more control variables, and make control decisions based on the one or more control variables. For example, the control decision may be to increase the number of trucks dispatched, and/or to increase the overall site velocity of the trucks currently dispatched. As another example, the control decision may be to reduce the commodity inventory at autonomous mining worksite 100. Communication interface 280 may be configured to communicate the control decisions to the individual facilities at autonomous mining worksite 100, such as trucks 110-130 and a mine warehouse (not shown), and/or to distributed control systems 160. The control decisions may be received by, for example, communication devices of truck 110-130 and implemented by their respective controllers.

Consistent with some embodiments, before the control decisions are sent out, display device 260 may display the control decisions to the operator of autonomous control system 200, and the operator may override the control decisions via user input interface 270. For example, display device 260 may display "yes" and "no" buttons to the operator inquiring if he/she wants to override the control decisions determined automatically by processor 240. The operator may provide input via user input interface 270, for example, by clicking on the "yes" or "no" button on display device 260. If the "yes" button is clicked, display device 260 may further display an interface for the operator to input control decisions manually. Communication interface 280 may be configured to communicate the user specified control decisions to the individual facilities at autonomous mining worksite 100.

In some embodiments, after the operator inputs his/her control decisions to override the determined control decisions, processor 240 may be configured to calculate a value of each index to be optimized, based on the user specified control decisions. Processor 240 may be further configured to calculate the optimized value of the index, based on the control variables determined by optimization. Processor 240 may compare the index value associated with the user specified control decisions with the optimized value associated with the control decisions determined by processor 240. If the values differ significantly (i.e., the difference between the two values exceeds a threshold), display device 260 may display comparison information to the operator. Display device 260 may display a message asking the operator to confirm if he/she truly wants to override the changes. Once confirmed, the user specified control decisions may be communicated to the individual facilities at autonomous mining worksite 100. Otherwise, the control decisions determined by processor 240 may be communicated.

Figure 3:
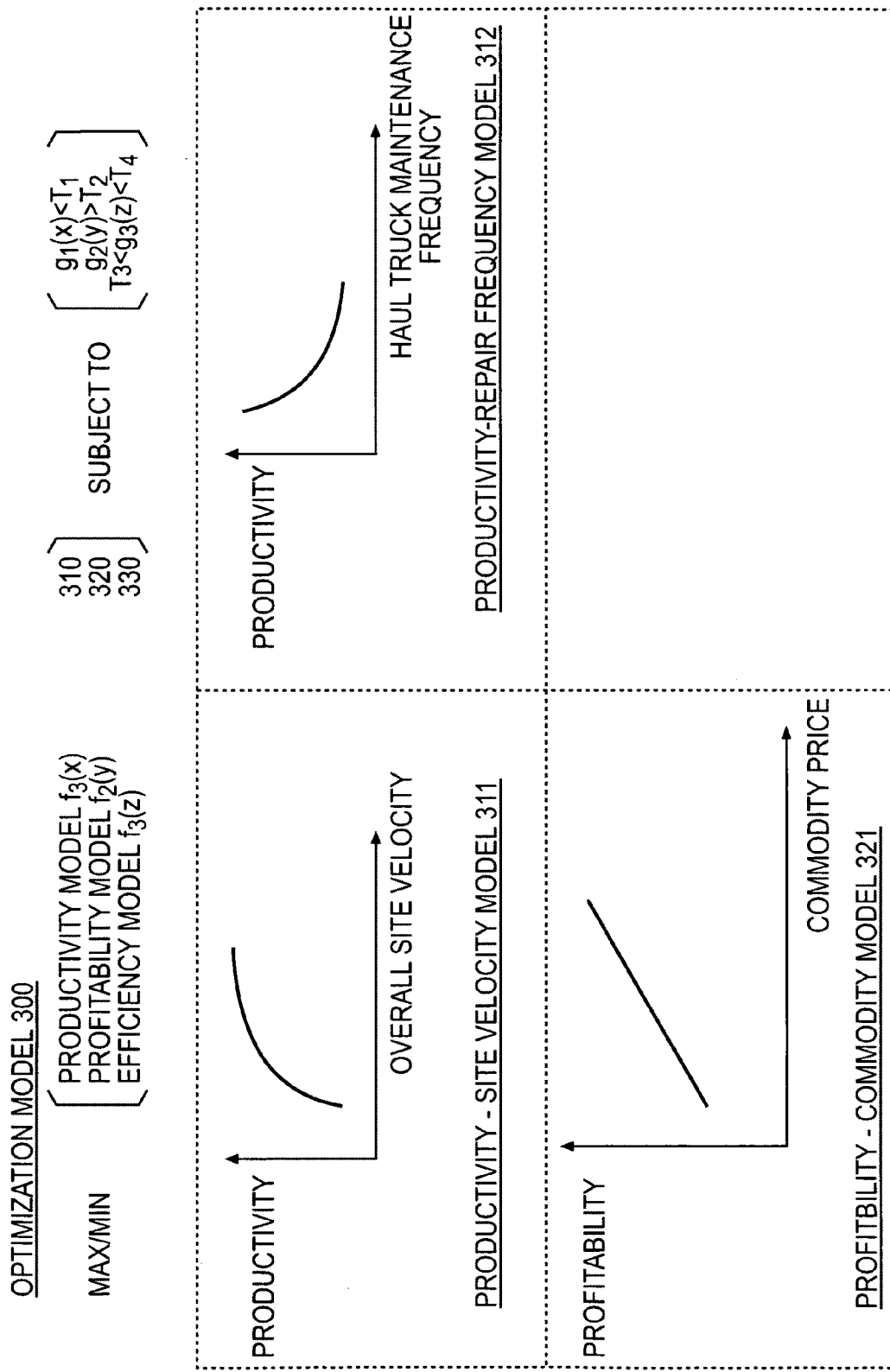
FIG. 3 is an illustration of an exemplary optimization model and a plurality of exemplary constraint models utilized by an control system, according to an exemplary embodiment of the present disclosure.

FIG. 3 is an illustration of an exemplary optimization model 300 and a plurality of exemplary constraint models 311, 312 and 321, utilized by autonomous control system 200. Optimization model 300 may be a mathematical model that attempts to maximize or minimize an objective function of one or more indices subject to one or more conditions. Optimization problems are also known as mathematical programming. Examples of optimization models may include linear programming (LP), integer programming, and zero-one programming.

As shown in FIG. 3, optimization model 300 may include an optimization notation, that is, "max" or "min," standing for maximization and minimization respectively. Optimization model 300 may further include an object function F that is being maximized or minimized. In some embodiments, the object function may be directly or indirectly associated with the one or more indices being optimized. For example, if the indices to be optimized are worksite productivity and profitability, the object function may be linearly or non-linearly proportional to worksite productivity and profitability. Other examples of indices may include efficiency of autonomous mining worksite 100.

Consistent with some embodiments, the object function may be a function of one (in the case of single variable optimization) or more (in the case of multiple variable optimization) control variables. In some embodiments, the control variables may be in the area of dispatch control. For example, a control variable may be the number and/or types of hauler trucks dispatched daily for hauling the materials. A control variable may also be the number of utility vehicles dispatched for haul road maintenance. In some embodiments, the control variables may be in the area of overall site velocity control. For example, a control variable may be the maximum velocities of an autonomous truck within its normal operating velocity range. A control variable may also be the amount of payload hauled by each hauler truck. A control variable may further be the maintenance interval of the utility trucks.

In some embodiments, the object function may be constructed using one or more constraint models and the collected information. For example, the object function may be a weighted sum of the one or more constraint models, such as, a productivity model 310 $f_1(x)$, a profitability model 320 $f_2(y)$, and an efficiency model 330 $f_3(z)$. The weights may reflect the relatively importance of the indices that are defined in the respective constraint models. It is contemplated that the object function may be constructed by combining the one or more constraint models in any other manner. The collected information, such as the economic market information and local worksite information, may also be used in constructing the object the function. For example, the commodity price may be used to derive the profitability of the worksite, based on the profitability model 320.

The constraint models 310-330 may each define a mathematical relationship between an index to be optimized and one or more control variables. That is, the index is a function of the one or more control variables. For example, in constraint models 310-330, $f_1$, $f_2$, and $f_3$ are the functions, and x, y, and z are the control variables. As shown in FIG. 3, productivity-site velocity model 311 may be an example of productivity model 310. Productivity (index to the optimized) may change non-linearly with overall site velocity (control variable x). As shown, productivity may first increase dramatically as the overall site velocity increases, and then may become saturated.

Productivity-repair frequency model 312 may be another example of productivity model 310. According to productivity-repair frequency model 312, productivity may change non-linearly with another control variable: the dealer repair frequency of haul truck 110 at autonomous mining worksite 100. As shown, productivity may first decrease dramatically as the dealer repair frequency increases, and then may become saturated. FIG. 3 further shows a profitability-commodity model 321, an example of profitability model 320. Profitability may increase linearly as the commodity price (i.e., control variable y) increases.

Optimization model 300 may further include one or more conditions on the control variables. Accordingly, the object function is optimized within the conditions of the control variables. These conditions may include, for example, that the overall site velocity is to be within a normal operation range, that the inventory size is to be limited by the capacity of the onsite warehouse, and that the trucks are to be repaired or maintained by the dealer at a frequency higher than a nominal level. For example, as shown in FIG. 3, the condition on control variable x may be defined as $g_1(x)<T_1$, where $g_1$ is a function of x, and $T_1$ is a threshold. Similarly, the conditions on control variables y and z may be defined as $g_2(y)>T_2$ and $T_3<g_3(z)<T_4$, where $g_2$ and $g_3$ are functions of y and z, respectively, and $T_1$ and $T_2$ are thresholds.

Optimization model 300 may be solved for a single control variable (i.e., as a single variable optimization) or multiple control variables (i.e., as a multiple variable optimization). In some embodiments, optimization model 300 may be solved with linear programming methods or non-linear programming methods. Various mathematical algorithms may be used to solve optimization model 300, including, for example, gradient descent, conjugate gradient, Newton's method, line search, and any other iterative or non-iterative methods known in the art.

Figure 4:
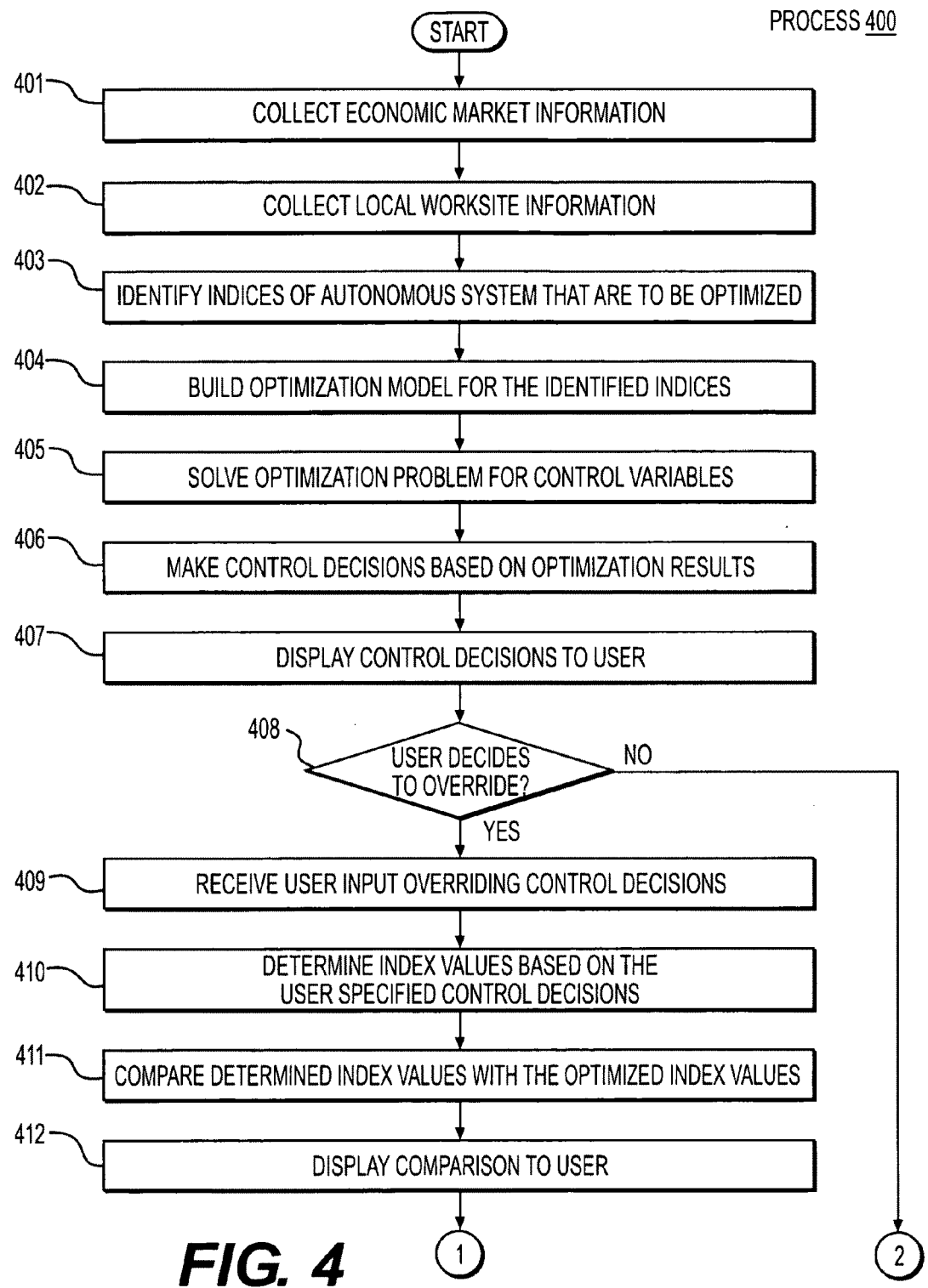
FIG. 4 is a flow chart of an exemplary operation process for controlling an autonomous worksite, consistent with the disclosed embodiment shown in FIG. 1.
Figure 4:
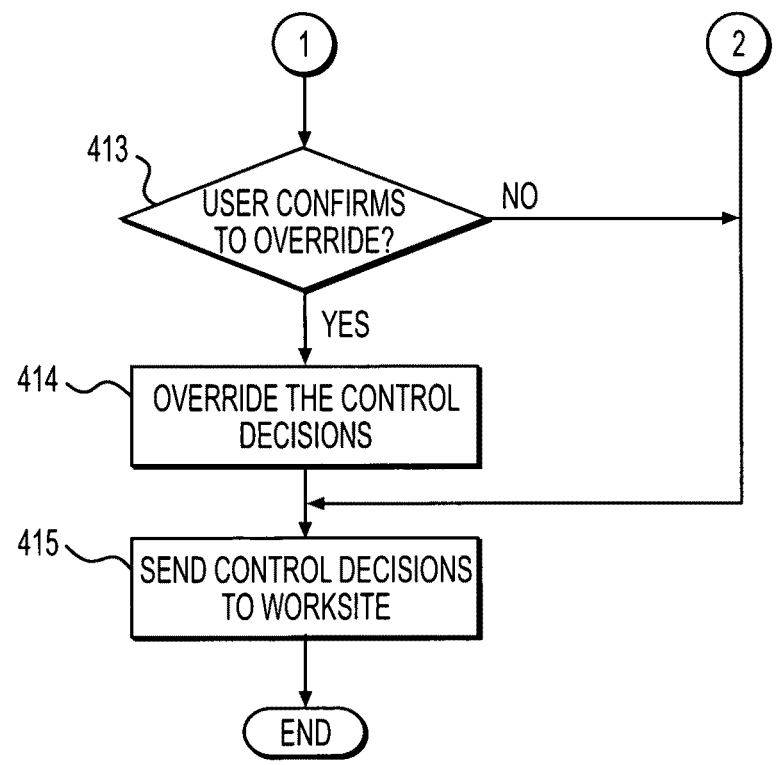

FIG. 4 is a flow chart of an exemplary operation process 400 for controlling an autonomous worksite, consistent with the disclosed embodiment shown in FIG. 1. Process 400 may begin when economic market information and local worksite information are collected (Step 401 and Step 402). Consistent with some embodiments, in Step 401, autonomous control system 200 may collect the economic market information from various web servers on Internet 140, via a network interface in communication interface 280. Consistent with some embodiments, autonomous control system 200 may collect the economic market information from satellite 150 via a satellite communication interface in communication interface 280. The economic market information may include, among other things, a commodity price of the materials (e.g., iron roe) hauled from autonomous mining worksite 100. The economic market information may also include other market information such as from the commodity trading market, stock market, bonds market, etc.

Consistent with some embodiments, in Step 402, autonomous control system 200 may collect the local worksite information from various trucks 110-130 and distributed control systems 160, via a wireless communication interface in communication interface 280. The local worksite information may include, such as, an overall site velocity of trucks 110-130, number of trucks dispatched for mine haulage and haul road maintenance, operating and maintenance costs of the trucks, and inventory size of the materials hauled from autonomous mining worksite 100.

In Step 403, one or more indices of autonomous mining worksite may be identified for optimization. In some embodiments, the indices may be identified by the operator of autonomous control system 200 via user input interface 270. For example, display device 260 may be configured to display a request to the operator inquiring if he/she wants to optimize any index based on the updated information. The operator may provide input via user input interface 270 by, for example, clicking on the "yes" or "no" button in response to the request. If the "yes" button is clicked, the operator may further identify one or more indices that he/she wants to optimize.

Once the indices are identified, processor 240 may be configured to build an optimization model for the identified indices (Step 404). For example, processor 240 may execute autonomous control tool 201 to build optimization model 300 for optimizing the productivity, profitability and efficiency of autonomous mining worksite 100. In some embodiments, processor 240 may obtain constraint models that characterize relationships between the indices and one or more control variables, from storage device 230 and/or database 250. For example, processor 240 may obtain productivity model 310, profitability model 320, and efficiency model 330. Processor 240 may further construct an object function based on the combination of these constraint models. Processor 240 may also determine conditions that the control variables need to satisfy, and include these conditions in optimization model 300.

In Step 405, processor 240 may be configured to solve the optimization problem for the one or more control variables. For example, processor 240 may execute autonomous control tool 201 to solve optimization model 300 for the control variables such as overall site velocity, number of trucks dispatched, and haul truck dealer repair frequency at autonomous mining worksite 100. The optimization problem may be solved with various linear programming or non-linear programming methods, including, for example, gradient descent, conjugate gradient, Newton's method, line search, and other algorithms known in the art.

After the control variables are solved, processor 240 may make control decisions based on the solved control variables (Step 406). For example, once the number of trucks that are to be dispatched is determined, processor 240 may execute autonomous control tool 201 to compare this number with the number of trucks currently dispatched (as in the collected information), and determine if more or less trucks should be dispatched. It may be further determined which trucks are to be dispatched or recalled.

The control decisions may be displayed to the operator of autonomous control system 200, via display device 260 (Step 407). In some embodiments, display device 260 may display "yes" and "no" buttons to the operator inquiring if he/she wants to override the control decisions determined by processor 240. The operator may provide input via user input interface 270, for example, by clicking on the "yes" or "no" button on display device 260. If the operator does not want to override the decisions (Step 407: No), process 400 may proceed to Step 415 to send the control decisions to autonomous mining worksite 100. For example, autonomous control system 200 may communicate the control decisions to the individual facilities at autonomous mining worksite 100, such as trucks 110-130.

If the operator does not want to override the decisions (Step 407: Yes), autonomous control system 200 may receive user inputs that override the control decisions (Step 409). For example, if the operator click the "yes" button, display device 260 may further display an interface for the operator to input control decisions manually. After the operator inputs his/her control decisions to override the control decisions determined by optimization, processor 240 may be configured to calculate a value of each index to be optimized, based on the user specified control decisions (Step 409). In some embodiments, processor 240 may execute autonomous control tool 201 to calculate the index values using the relevant constraint models. For example, the productivity value may be calculated based on the overall site velocity determined in Step 405, and productivity-site velocity model 311. Meanwhile, processor 240 may be further configured to calculate the optimized value of the indices, based on the control variables.

Processor 240 may compare the index value associated with the user specified control decisions with the optimized value associated with the control decisions determined in Step 405 (Step 411). If the values differ significantly, for example, the difference between the two values exceeds a threshold, display device 260 may display the comparison information to the operator (Step 412). Display device 260 may display a message asking the operator to confirm if he/she truly wants to override the changes (Step 413).

If the override is confirmed (Step 413: Yes), autonomous control system 200 may overwrite the determined control decisions using the user specified control decisions (Step 414): Autonomous control system 200 may then provide the control decisions to the individual facilities at autonomous mining worksite 100 (Step 415). For example, communication interface 280 may be configured to communicate the control decisions to trucks 110-130 at autonomous mining worksite 100, via wireless communication. Otherwise (Step 413: No), process 400 may proceed to Step 415 where the automatically determined control decisions may be communicated. Process 400 may conclude after Step 415.

Industrial Applicability

The disclosed system and method may be applied on any type of an autonomous worksite control. For example, on an autonomous mining worksite, trucks 110-130 may be dispatched for mine haulage tasks or haul road maintenance tasks. The trucks may each operate at a certain velocity while dispatched for hauling materials. The haul trucks may be repaired or maintained by the dealer at a certain frequency. The hauled materials may be transported to an onsite warehouse for inventory storage, and later be sold on the mine trading market. The truck dispatch rate, the overall site velocity, the dealer repair frequency, and the inventory size, etc, may be variables that influence worksite indices such as productivity, profitability, and efficiency. Autonomous control system 200 may be implemented to determine values for these variables, and make control decisions to control the various facilities at autonomous mining worksite 100.

Consistent with the present disclosure, autonomous control system 200 may include an autonomous control tool 201 to make control decisions. Autonomous control system 200 may be configured to collect economic market information related to profitability from Internet 140 and/or satellite 150, and local worksite information from autonomous mining worksite 100. Autonomous control system 200 may be further configured to build an optimization model for optimizing indices such as productivity, profitability, and efficiency, based on constraint models and the collected information. Each constraint model may characterize the mathematical relationship between an index and at least one control variables such as the truck dispatch rate, the overall site velocity, the dealer repair frequency, and the inventory size, etc. Autonomous control system 200 may be further configured determine these control variables by solving the optimization model, then make control decisions based on the determined control variables, and provide the control decision to autonomous mining worksite 100. Autonomous control system 200 may also allow the operator to override and compare the effect of the user specified control variables and the automatically determined control variables.

Although the disclosed embodiments are described in association with an autonomous mining worksite associated with mining operations, the disclosed autonomous control system and method may be used on any other type of autonomous worksite known in the art, for example, a landfill worksite, a quarry worksite, or a construction worksite. The disclosed autonomous control system may effectively optimize indices associated with the autonomous worksite and provide control decisions. Furthermore, the disclosed system may allow the user to override the control decisions. In addition, the control decisions of the disclosed system may be updated in real time in response to the dynamically changing economic market.

It will be apparent to those skilled in the art that various modifications and variations can be made in the disclosed system and method without departing from the scope of the disclosure. Additionally, other embodiments of the disclosed system and method will be apparent to those skilled in the art from consideration of the specification. It is intended that the specification and examples be considered as exemplary only, with a true scope of the disclosure being indicated by the following claims and their equivalents.

What is claimed is:

1. A control system for providing a control decision to an autonomous worksite including a plurality of machines, comprising:
   an operator interface;
   a communication interface configured to collect economic market information and autonomous worksite operations information;
   a storage device configured to store the collected information and a plurality of autonomous worksite optimization models each characterizing a mathematical relationship between a corresponding worksite optimization index and at least one worksite dispatch control variable, wherein the plurality of autonomous worksite optimization models includes a worksite profitability model for optimizing a worksite profitability index, a worksite efficiency model for optimizing a worksite efficiency index, and a worksite productivity optimization model for optimizing a worksite productivity index; and
   a processor coupled to the communication interface and the storage device, wherein the processor is configured to:

allow, via the operator interface, an operator to select a worksite optimization index;

identify a worksite dispatch control variable;

using an autonomous worksite optimization model of the plurality of autonomous worksite optimization models that corresponds to the selected worksite optimization index, optimize the selected worksite productivity index based on the economic market information and on the autonomous worksite operations information, to determine an optimized value for the identified worksite dispatch control variable;

compare the optimized value for the identified worksite dispatch control variable to an actual value for the identified worksite dispatch control variable determined from the received autonomous worksite operations information;

make a dispatch control decision, based on the comparison; and provide the dispatch control decision to the autonomous worksite.

2. The control system of claim 1, wherein the processor is further configured to:

receive, via the operator interface, an operator-specified dispatch control decision; and override the dispatch control decision made by the processor with the received operator-specified dispatch control decision.

3. The control system of claim 1, wherein the plurality of machines includes:

a plurality of hauler trucks configured to haul materials from the mining worksite; and a plurality of utility trucks configured to maintain a haul road.

4. The control system of claim 3, wherein the economic market information includes a commodity price of the materials hauled from the mining worksite.

5. The control system of claim 3, wherein autonomous worksite information includes at least one of an overall site velocity of the plurality of mining trucks, number of trucks dispatched, operating and maintenance costs of the mining trucks, and inventory size of the materials hauled from the mining worksite.

6. The control system of claim 1, wherein the communication interface includes a network interface configured to collect the economic market information from an Internet.

7. The control system of claim 1, wherein the communication interface includes a satellite communication interface configured to collect the economic market information from a satellite.

8. A computer-implemented method for providing a decision to an autonomous worksite including a plurality of machines, the method comprising:

collecting economic market information and autonomous worksite operations information;

allowing, via an operator interface, an operator to select an autonomous worksite optimization index;

identifying at least one dispatch control variable for controlling dispatch of the plurality of machines;

accessing an autonomous worksite optimization model that characterizes a mathematical relationship between the selected autonomous worksite optimization index and the identified at least one dispatch control variable, wherein the plurality of autonomous worksite optimization model includes a worksite profitability model for optimizing a worksite profitability index, a worksite efficiency model for optimizing a worksite efficiency index, and a worksite productivity optimization model for optimizing a worksite productivity index;

optimizing, by at least one computer processor, the selected autonomous worksite optimization index using the accessed autonomous worksite optimization model, based on the collected economic market information and autonomous worksite operations information, to determine an optimized value for the identified at least one dispatch control variable;

comparing the optimized value for the identified at least one dispatch control variable to an actual value for the identified at least one dispatch control variable determined from the autonomous worksite operations information;

making a dispatch control decision, by the at least one computer processor and based on the comparison; and providing the dispatch control decision to the autonomous worksite.

9. The method of claim 8, further including:

receiving, via the operator interface, an operator-specified dispatch control decision; and overriding the dispatch control decision made by the at least one computer processor with the user specified control decision.

10. The method of claim 8, wherein the economic market information includes a commodity price of products produced by the autonomous worksite, and the autonomous worksite information includes at least one of an overall site velocity, a site operating and maintenance cost, and an inventory size of products produced by the autonomous worksite.

11. The method of claim 8, wherein optimizing includes solving the accessed autonomous worksite optimization model with linear programming or non-linear programming.

12. An autonomous worksite system, comprising:

a plurality of trucks;

a control system configured to provide a decision to the plurality of trucks, including:

an operator interface;

a communication interface configured to collect worksite economics information and autonomous worksite operations information;

a storage device configured to store:

the collected worksite economics information and autonomous worksite operations information;

a plurality of autonomous worksite optimization models characterizing a mathematical relationship between a corresponding worksite optimization index and at least one worksite dispatch control variable, wherein the plurality of autonomous worksite optimization models includes a worksite profitability model for optimizing a worksite profitability index, a worksite efficiency model for optimizing a worksite efficiency index, and a worksite productivity optimization model for optimizing a worksite productivity index;

a processor coupled to the communication interface and the storage device, wherein the processor is configured to:

allow, via the operator interface, an operator to select a worksite optimization index;

identify a worksite dispatch control variable;

using an autonomous worksite optimization model of the plurality of autonomous worksite optimization models that corresponds to the selected worksite optimization index, optimize the selected worksite productivity index based on the collected worksite economics information and the autonomous worksite operations information, to determine an optimized value for the worksite dispatch control variable;

compare the optimized value for the identified worksite dispatch control variable to an actual value for the identified worksite dispatch control variable;

make a dispatch control decision, based on the comparison; and provide the dispatch control decision to the plurality of trucks.

13. The system of claim 1, wherein the worksite dispatch control variable is identified from among one or more of a number of the plurality of autonomous machines, a type of the plurality of autonomous machines, a velocity of the plurality of autonomous machines, a payload of the plurality of autonomous machines, or a maintenance interval of the plurality of autonomous machines.

14. The system of claim 1, wherein the economic market information includes a price of a commodity obtained from the autonomous worksite, and the worksite operations information includes one or more of a velocity of the plurality of machines, a number of dispatched machines, operating or maintenance cost of the plurality of machines, or inventory of the commodity obtained from the autonomous worksite.

15. The method of claim 8, wherein the at least one worksite dispatch control variable is identified from among one or more of a number of the plurality of autonomous machines, a type of the plurality of autonomous machines, a velocity of the plurality of autonomous machines, a payload of the plurality of autonomous machines, or a maintenance interval of the plurality of autonomous machines.

16. The method of claim 8, wherein the economic market information includes a price of a commodity obtained from the autonomous worksite, and the worksite operations information includes one or more of a velocity of the plurality of machines, a number of dispatched machines, operating or maintenance cost of the plurality of machines, or inventory of the commodity obtained from the autonomous worksite.

17. The system of claim 12, wherein the worksite dispatch control variable is identified from among one or more of a number of the plurality of autonomous machines, a type of the plurality of autonomous machines, a velocity of the plurality of autonomous machines, a payload of the plurality of autonomous machines, or a maintenance interval of the plurality of autonomous machines.

18. The system of claim 12, wherein the economic market information includes a price of a commodity obtained from the autonomous worksite, and the worksite operations information includes one or more of a velocity of the plurality of machines, a number of dispatched machines, operating or maintenance cost of the plurality of machines, or inventory of the commodity obtained from the autonomous worksite.

* * * * *